(12) United States Patent
Shingaki

(10) Patent No.: US 7,177,966 B2
(45) Date of Patent: Feb. 13, 2007

(54) MICROCOMPUTER MINIMIZING INFLUENCE OF BUS CONTENTION

(75) Inventor: Yasunori Shingaki, Itami (JP)

(73) Assignee: Renesas Technology Corp., Tokyo (JP)

( * ) Notice: Subject to any disclaimer, the term of this patent is extended or adjusted under 35 U.S.C. 154(b) by 155 days.

(21) Appl. No.: 11/069,013

(22) Filed: Mar. 2, 2005

(65) Prior Publication Data

US 2005/0198420 A1    Sep. 8, 2005

(30) Foreign Application Priority Data

Mar. 2, 2004    (JP) ............................. 2004-057919

(51) Int. Cl.
G06F 13/38    (2006.01)
G06F 13/28    (2006.01)

(52) U.S. Cl. ...................... 710/241; 710/107; 710/240

(58) Field of Classification Search ................ 710/262, 710/264, 266, 240–244, 107–125, 28
See application file for complete search history.

(56) References Cited

U.S. PATENT DOCUMENTS

| | | | | |
|---|---|---|---|---|
| 4,106,983 A | * | 8/1978 | Meuschke et al. | 376/247 |
| 4,153,934 A | * | 5/1979 | Sato | 718/103 |
| 4,298,928 A | * | 11/1981 | Etoh et al. | 710/29 |
| 4,868,784 A | * | 9/1989 | Marshall et al. | 710/316 |
| 4,959,782 A | * | 9/1990 | Tulpule et al. | 710/240 |
| 5,060,168 A | * | 10/1991 | Jingu | 358/1.17 |
| 5,388,230 A | * | 2/1995 | Yamada et al. | 710/316 |
| 5,757,795 A | * | 5/1998 | Schnell | 370/392 |
| 5,960,458 A | * | 9/1999 | Kametani | 711/147 |
| 6,981,073 B2 | * | 12/2005 | Wang et al. | 710/28 |

FOREIGN PATENT DOCUMENTS

| | | | |
|---|---|---|---|
| EP | 814408 A2 | * | 12/1997 |
| EP | 1093252 A2 | * | 4/2001 |
| JP | 64-076254 | | 3/1989 |
| JP | 1-291354 | | 11/1989 |
| JP | 04-218857 | | 8/1992 |
| JP | 2001-067310 | | 3/2001 |
| JP | 2001-209609 | | 8/2001 |
| JP | 2003-067324 | | 3/2003 |

OTHER PUBLICATIONS

Guibaly, Fayez El. Design and Analysis of Arbitration Protocols. Feb. 1989. IEEE Transactions On Computers, vol. 38, No. 2.*
Delavari, A. Microprocessor Based System Design. Jun. 30, 1988. Electronics Letters, vol. 24, No. 16.*
Chande et al. Modular Tri-Module Redundant (TMR) Multiprocessor System. 1988.*
Suzuki et al. A 2000-MOPS Embedded RISC Processor with a Rambus DRAM Controller. Jul. 7, 1999. IEEE Journal of Solid-State Circuits, vol. 34, No. 7.*

* cited by examiner

Primary Examiner—Mark H. Rinehart
Assistant Examiner—Matthew Spittle
(74) Attorney, Agent, or Firm—Buchanan Ingersoll & Rooney PC

(57) ABSTRACT

An edge detecting circuit detects an input level change (edge) of a synchronous signal provided from a synchronous signal input terminal. A data latch unit latches digital data provided from an external data input terminal. An address generating circuit provides an address signal. A write control unit activates/deactivates a write enable signal for writing to a RAM. An arbitration circuit monitors a write control enable signal, a read enable signal and a write enable signal, and detects a cycle, in which a CPU does not access the RAM.

10 Claims, 12 Drawing Sheets

MICROCOMPUTER MINIMIZING INFLUENCE OF BUS CONTENTION

BACKGROUND OF THE INVENTION

1. Field of the Invention

The present invention relates to a microcomputer, and particularly to a microcomputer taking data, which is transmitted in synchronization with a certain signal, into its internal storage device.

2. Description of the Background Art

For example, the following conventional techniques have been used for taking multiple bits of data, which are transmitted in synchronization with a certain signal, into a storage device such as an internal RAM (Random Access Memory) of a microcomputer.

A conventional interface circuit can hold a write control signal, an address control signal and data at rising and falling of a clock signal, and can reduce waiting times required for reading and writing (see, e.g., Japanese Patent Laying-Open No. 2003-067324).

A conventional microcomputer system can control external transfer of data to and from the microcomputer, and can also perform internal arithmetic processing of the microcomputer in a parallel manner (see, e.g., Japanese Patent Laying-Open No. 2001-209609).

A conventional data processing device can perform switching between single edge access and double edge access for use on one bus so that stream data can be efficiently transferred on the bus (see, e.g., Japanese Patent Laying-Open No. 2001-067310).

A conventional fast/slow interface circuit is controlled to switch a selector to an I/O circuit side only during a period for reading previously stored data from a memory, and to latch the data by a latch circuit, and the I/O circuit compares the previous data latch thus latched and the latch data so that a time required for access to a shared memory by the I/O circuit can be reduced (see, e.g., Japanese Patent Laying-Open No. 04-218857).

A conventional data transfer control device usually performs DMA (Direct Memory Access) processing in a burst operation mode, and can be automatically switched to a cycle steal operation mode when processing by a CPU (Central Processing Unit) is required. Thereby, the mode can be switched by an interrupt to the cycle steal mode when necessary (see, e.g., Japanese Patent Laying-Open No. 01-291354).

In a conventional bus arbitration device, it is possible to reduce an arbitration time for a bus master, which accesses a bus most frequently, and further, an arbitration between two bus masters is successively repeated so that the device can be easily applied to the case where three or more bus masters are employed (see, e.g., Japanese Patent Laying-Open No. 64-076254).

The following problem occurs when parallel data, which are input in synchronization with an external signal, are taken in by the DMA. First, a DMA start cycle may be disturbed due to bus contention between a CPU and the DMA. Since this causes a bottleneck in a fast operation when taking in external data, it is necessary to impose access limitation on the CPU. Second, definition of setup-time/hold-time may be required if DMA starts according to certain timing. This also causes a bottleneck in the fast operation.

Although the prior arts already described can partially overcome these problems, these problems can also be overcome by a technique other than the foregoing prior arts.

SUMMARY OF THE INVENTION

An object of the invention is to provide a microcomputer, which can minimize an influence of bus contention between a CPU and a DMA, and can flexibly change setup-time/hold-time.

A microcomputer according to the invention includes an edge detecting circuit detecting a change in input level of an externally applied synchronous signal, and providing an edge detection signal notifying of the input level change; a data latch unit receiving the edge detection signal, and providing a data latch signal by latching externally applied external data; an address generating circuit generating an address signal; a local bus receiving the data latch signal and the address signal; a write control unit receiving the edge detection signal, and activating a write control enable signal; a central processing unit providing a read enable signal and a write enable signal; a data bus receiving data for input/output to or from the central processing unit; a storage device storing the external data; a memory bus receiving data for input/output to or from the storage device; and an arbitration circuit connected to the local bus, the data bus and the memory bus, monitoring the write control enable signal, the read enable signal and the write enable signal, and detecting a cycle executed without accessing to the memory by the central processing unit.

According to the invention, an influence of bus contention between a CPU and a DMA can be minimized, and setup-time/hold-time can be flexibly changed so that fast external interference can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the figures, the same or corresponding portions bear the same reference numbers, and description thereof is not repeated.

Figure 1:
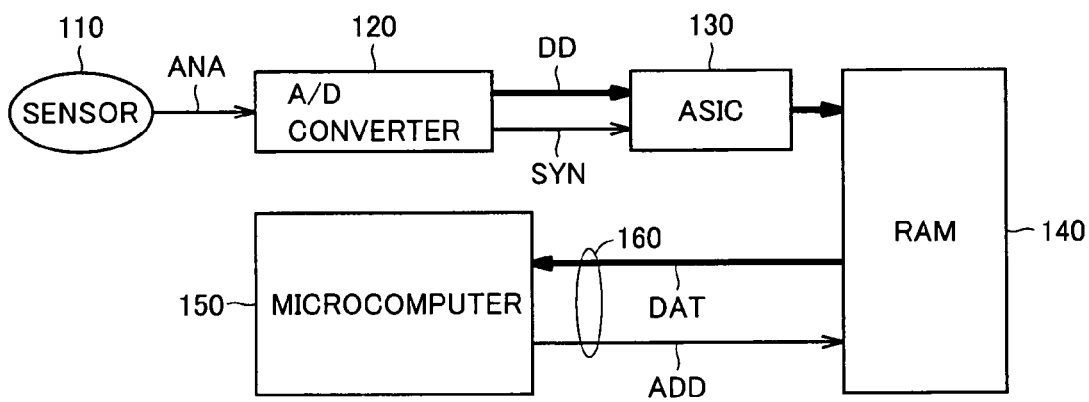
FIG. 1 is a block diagram showing a block structure of a microcomputer system 100 forming a background of an embodiment of the invention.

FIG. 1 is a block diagram showing a block structure of a microcomputer system 100 forming a background of an embodiment of the invention.

Referring to FIG. 1, microcomputer system 100 includes a sensor 110, an A/D converter 120, an ASIC (Application Specific Integrated Circuit) 130, a RAM 140, a microcomputer 150 and an external bus 160.

Sensor 110 detects a certain event, and provides an analog signal ANA corresponding to it. A/D converter 120 converts analog signal ANA to digital data DD, and provides a synchronous signal SYN. In this embodiment, it is assumed that the A/D conversion (an output data width of digital data DD) has a precision of 8 bits, for the sake of convenience.

ASIC 130 receives digital data DD and synchronous signal SYN, and detects a rising or falling edge of synchronous signal SYN. ASIC 130 produces address signals and various control signals required for writing data into RAM 140, and provides the data to RAM 140 in synchronization with the respective edges of synchronous signal SYN. ASIC 130 is an external logic circuit of microcomputer 150.

Microcomputer 150 is connected to the external memory, i.e., RAM 140 via external bus 160. Microcomputer 150 executes software to read data DATA stored in RAM 140 by using an address signal ADD.

Figure 2:
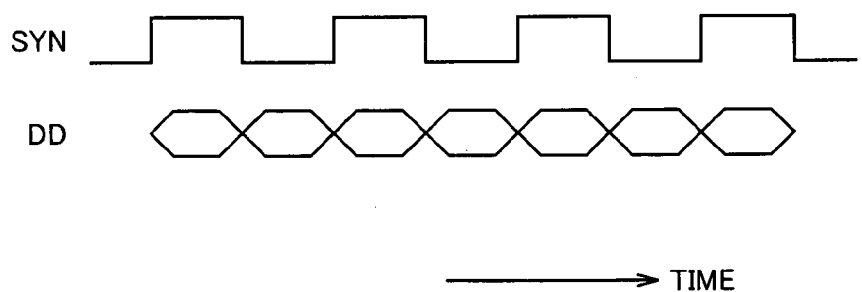
FIG. 2 is a waveform diagram illustrating signal waveforms of microcomputer system 100 forming the background of the embodiment of the invention.

FIG. 2 is a waveform diagram illustrating signal waveforms of microcomputer system 100 forming the background of the embodiment of the invention As illustrated in FIG. 2, digital data DD changes in synchronization with synchronous signal SYN. Synchronous signal SYN has a period determined according to a request by microcomputer system 100 shown in FIG. 1.

Referring to FIG. 1, the cycle of the operation performed via external bus 160 is generally longer than that of the operation in microcomputer 150. Therefore, as an amount of data taken into microcomputer 150 increases, a time required for taking in data increases within a CPU processing time of microcomputer 150, and a CPU time, which can be consumed for other kinds of processing, decreases. Accordingly, even if an internal operation speed of microcomputer 150 increases, it cannot be expected that a processing performance of microcomputer system 100 is improved in proportion to it.

Microcomputer system 100 requires many interconnections such as external bus 160 outside microcomputer 150. Therefore, a problem of interconnection noises may occur, and additional parts for preventing noises may be required. This causes problems of the cost and footprint in microcomputer system 100 in addition to the costs of external parts such as ASIC 130 and RAM 140.

Figure 3:
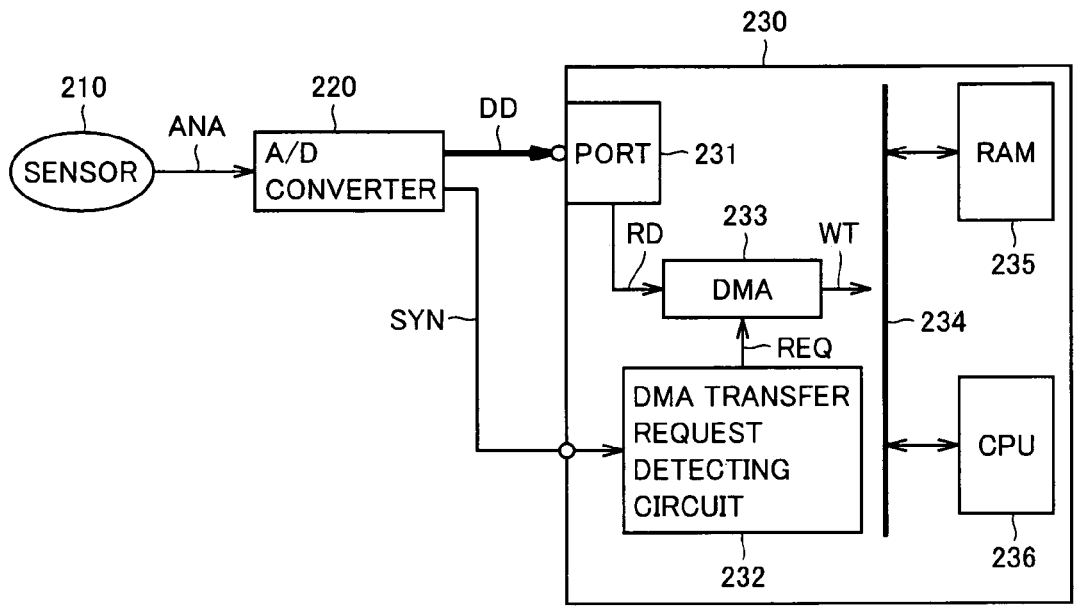
FIG. 3 is a block diagram showing a block structure of a microcomputer system 200 forming a background of the embodiment of the invention.

FIG. 3 is a block diagram showing a block structure of a microcomputer system 200 forming a background of the embodiment of the invention.

Referring to FIG. 3, microcomputer system 200 includes a sensor 210, an A/D converter 220 and a microcomputer 230. Microcomputer 230 includes a port 231, a DMA transfer request detecting circuit 232, a DMA 233, an internal bus 234, a RAM 235 and a CPU 236.

Sensor 210 detects a certain event, and provides analog signal ANA corresponding to it. A/D converter 220 converts analog signal ANA to digital data DD, and provides synchronous signal SYN. Port 231 receives digital data DD, and provides a read data signal RD. DMA transfer request detecting circuit 232 detects the rising or falling edge of synchronous signal SYN, and provides a DMA transfer request signal REQ to DMA 233.

DMA 233 receives DMA transfer request signal REQ, reads read data signal RD (digital data DD) from port 231, and writes a write data signal WT (digital DD) into RAM 235 via internal bus 234. The address of port 231 for reading read data signal RD and the address in RAM 235 for writing write data signal WT are both preset by software in CPU 236.

The system may be set such that the address for writing data is incremented every time write data signal WT is written into RAM 235. Thereby, write data signal WT can be successively written into RAM 235 without a load on CPU 236.

Figure 4:
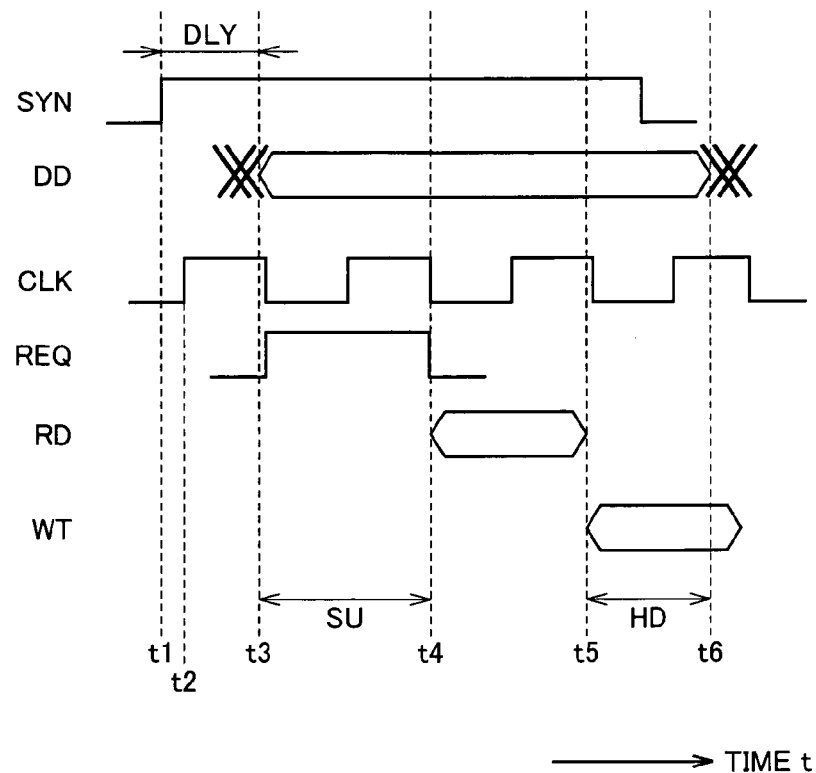
FIG. 4 is a waveform diagram illustrating signal waveforms of microcomputer system 200 forming the background of the embodiment of the invention.

FIG. 4 is a waveform diagram illustrating signal waveforms of microcomputer system 200 forming the background of the embodiment of the invention.

Referring to FIG. 4, synchronous signal SYN rises at a time t1, and an internal clock signal CLK of microcomputer 230 rises at a time t2. DMA transfer request detecting circuit 232 in FIG. 3 detects the change in synchronous signal SYN in response to the rising of internal clock signal CLK, and provides DMA transfer request signal REQ at a time t3. DMA 233 in FIG. 3 receives DMA transfer request signal REQ, reads read data signal RD at a time t4, and writes write data signal WT at a time t5. A time between times t3 and t4 is referred to as a setup time SU, and a time between times t5 and t6 is referred to as a hold time HD.

Referring to FIG. 3, CPU 236 and DMA 233 in microcomputer system 200 access RAM 235 via the same internal bus 234. Therefore, in the structure having DMA 233, which can continuously obtain a bus right of internal bus 234, microcomputer 230 can take in digital data DD at a rate of up to one transfer operation per two cycles.

In this structure, however, CPU 236 cannot access RAM 235 while DMA 233 is accessing RAM 235. If microcomputer 230 includes a ROM (Read Only Memory) in addition to RAM 235, this ROM is usually connected to the same internal bus 234 as RAM 235. In this structure, therefore, CPU 236 cannot fetch program codes from the ROM, and the operation of CPU 236 stops.

Conversely, in such a structure that returns a right of use of internal bus 234 to CPU 236 upon every completion of one DMA transfer operation, CPU 236 operates intermittently. Assuming that CPU 236 in the above structure returns the right of use of the bus to DMA 233 after using internal bus 234 for one cycle, the data is taken in at a rate of up to one transfer operation per three cycles. Consequently, microcomputer 230 has a low data take-in rate.

In the case where microcomputer 230 reads digital data DD via port 231, setup time SU and hold time HD (both illustrated in FIG. 4) are required with respect to read data signal RD for writing correct data in RAM 235. However, if there is a factor such as presence of a propagation delay DLY (see FIG. 4) between synchronous signal SYN and digital data DD, it may be impossible to satisfy conditions relating to setup time SU and hold time HD. This requires, e.g., increasing of a period of synchronous signal SYN, and thus causes situations, in which the system performance of microcomputer system 200 must be lowered.

In the above case, the DMA transfer is performed every time the rising or falling edge of synchronous signal SYN is detected, and digital data DD equal in number to the edges are taken in. However, unnecessary data is present in digital data DD, as is the case for a CCD (Charge Coupled Device) having an invalid pixel region. RAM 235 may take in such unnecessary data. This results in a problem that a storage region in RAM 235 is wasted.

According to an embodiment of the invention, the foregoing problems are overcome by a structure and an operation of a microcomputer, which will now be described in detail.

Figure 5:
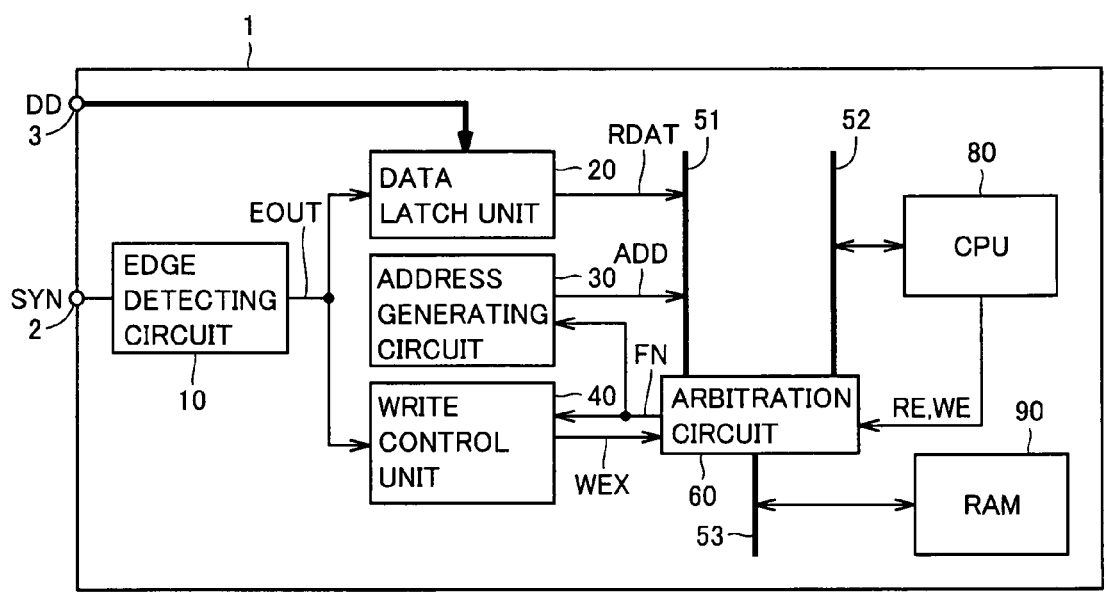
FIG. 5 is a block diagram showing a block structure of a microcomputer 1 according to the embodiment of the invention.

FIG. 5 is a block diagram showing a block structure of microcomputer 1 according to the embodiment of the invention.

Referring to FIG. 5, microcomputer 1 according to the embodiment of the invention includes a synchronous signal input terminal 2, an external data input terminal 3, an edge detecting circuit 10, a data latch unit 20, an address generating circuit 30, a write control unit 40, a local bus 51, a data bus 52, a memory bus 53, an arbitration circuit 60, a CPU 80 and a RAM 90.

Edge detecting circuit 10 detects an input level change (edge) of synchronous signal SYN provided from synchronous signal input terminal 2, and provides an edge detection signal EOUT notifying of edge detection. The input level changes include the rising edge and the falling edge, which can be selected by software. Data latch unit 20 receives edge detection signal EOUT, and provides a data latch signal RDAT, which is prepared by latching digital data DD provided from external data input terminal 3, onto local bus 51.

In response to a transfer completion signal FN and other provided from arbitration circuit 60, address generating circuit 30 provides address signal ADD onto local bus 51. Write control unit 40 receives edge detection signal EOUT, and activates a write control enable signal WEX for writing data into RAM 90. Write control unit 40 receives transfer completion signal FN provided from arbitration circuit 60, and deactivates write control enable signal WEX.

CPU 80 provides a read enable signal RE and a write enable signal WE to arbitration circuit 60 via memory bus 53. Arbitration circuit 60 monitors write control enable signal WEX, read enable signal RE and write enable signal WE, and detects a cycle, in which CPU 80 does not access RAM 90. Arbitration circuit 60 provides various signals, which are used for writing data latch signal RDAT into RAM 90, via data bus 52 to RAM 90, and also provides transfer completion signal FN to address generating circuit 30 and write control unit 40. RAM 90 is connected to arbitration circuit 60 via memory bus 53.

Specific circuit structures and operations of the respective blocks will now be described.

Figure 6:
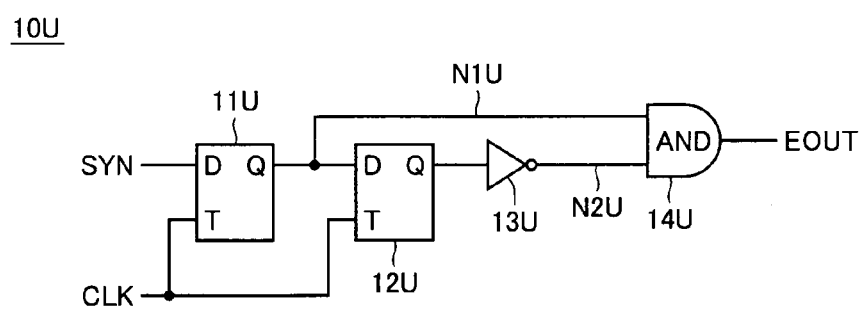
FIG. 6 is a circuit diagram showing a circuit structure of an edge detecting circuit 10U, which is an example of an edge detecting circuit 10 according to the embodiment of the invention.

FIG. 6 is a circuit diagram showing a circuit structure of an edge detecting circuit 10U, which is an example of edge detecting circuit 10 according to an embodiment of the invention.

Referring to FIG. 6, edge detecting circuit 10U is a rising edge detecting circuit, which detects the rising edge of synchronous signal SYN, and includes flip-flop circuits 11U and 12U, an inverter 13U and an AND circuit 14U.

Flip-flop circuits 11U and 12U operate in synchronization with internal clock signal CLK of microcomputer 1. Flip-flop circuit 11U temporarily holds synchronous signal SYN, and then provides it to a node N1U. Flip-flop circuit 12U temporarily holds the output signal of flip-flop circuit 11U. Inverter 13U inverts the output signal of flip-flop circuit 12U, and provides it to a node N2U. AND circuit 14U receives input signals from nodes N1U and N2U, and provides edge detection signal EOUT.

Figure 7:
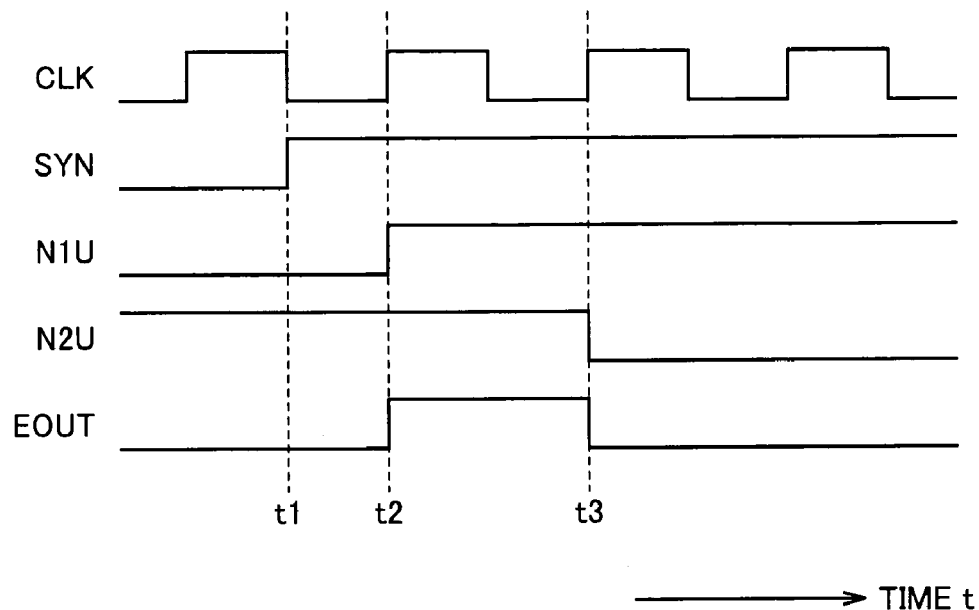
FIG. 7 is a timing diagram illustrating operation timing of edge detecting circuit 10U, which is an example of edge detecting circuit 10 according to the embodiment of the invention.

FIG. 7 is a timing diagram illustrating operation timing of edge detecting circuit 10U, which is an example of edge detecting circuit 10 according to the embodiment of the invention.

As illustrated in FIG. 7, synchronous signal SYN rises in synchronization with internal clock signal CLK at time t1. In response to it, the potential level of node N1U rises to the H-level (logical high) at time t2. At time t2, node N2U is already at the H-level so that edge detection signal EOUT rises from the L-level (logical low) to the H-level at time t2. At time t3, the potential level of node N2U falls to the L-level, and edge detection signal EOUT simultaneously falls to the L-level in response to it.

Figure 8:
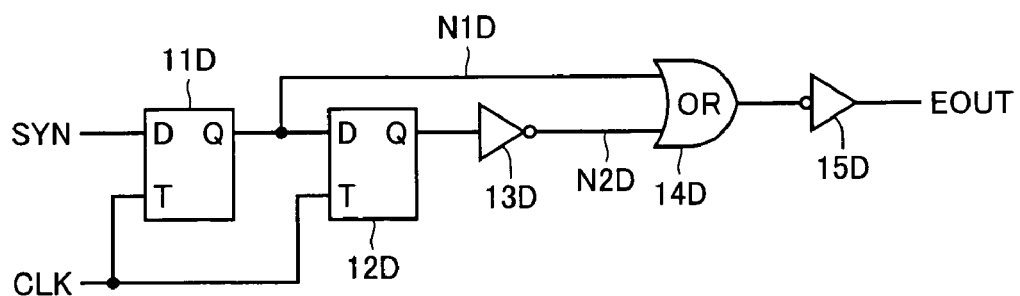
FIG. 8 is a circuit diagram showing a circuit structure of an edge detecting circuit 10D, which is another example of edge detecting circuit 10 according to the embodiment of the invention.

FIG. 8 is a circuit diagram showing a circuit structure of an edge detecting circuit 10D, which is another example of edge detecting circuit 10 of the embodiment of the invention.

Referring to FIG. 8, edge detecting circuit 10D is a falling edge detecting circuit detecting the falling edge of synchronous signal SYN, and includes flip-flop circuits 11D and 12D, inverters 13D and 15D, and an OR circuit 14D.

Flip-flop circuits 11D and 12D operate in synchronization with internal clock signal CLK of microcomputer 1. Flip-flop circuit 11D temporarily holds synchronous signal SYN, and then provides it to a node N1D. Flip-flop circuit 12D temporarily holds the output signal of flip-flop circuit 11D. Inverter 13D inverts the output signal of flip-flop circuit 12D, and provides it to a node N2D. OR circuit 14D receives input signals from nodes N1D and N2D. Inverter 15D provides edge detection signal EOUT by inverting the output signal of OR circuit 14D.

Figure 9:
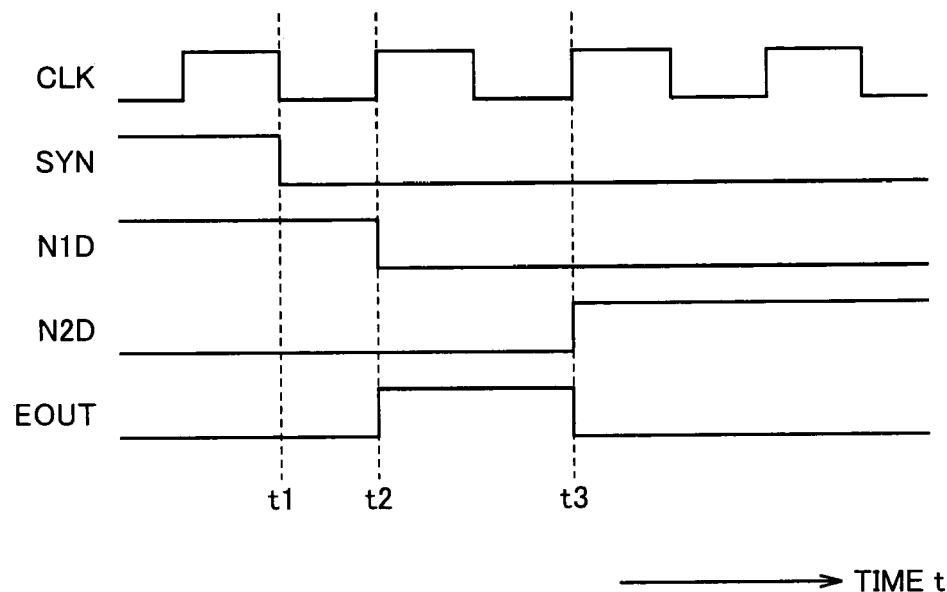
FIG. 9 is a timing diagram illustrating operation timing of edge detecting circuit 10D, which is another example of edge detecting circuit 10 according to the embodiment of the invention.

FIG. 9 is a timing diagram illustrating operation timing of edge detecting circuit 10D, which is another example of edge detecting circuit 10 according to the embodiment of the invention.

As shown in FIG. 9, synchronous signal SYN rises in synchronization with internal clock signal CLK at time t1. In response to it, the potential level of node N1D falls to the L-level at time t2. At time t2, node N2D is already at the L-level so that edge detection signal EOUT rises from the L-level to the H-level at time t2. At time t3, the potential level of node N2D rises to the H-level, and edge detection signal EOUT falls to the L-level in response to it.

Figure 10:
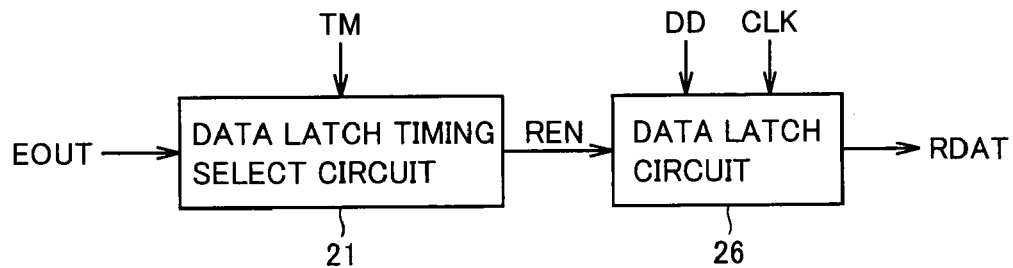
FIG. 10 is a block diagram showing a block structure of a data latch unit 20 according to the embodiment of the invention.

FIG. 10 is a block diagram showing a block structure of data latch unit 20 according to the embodiment of the invention.

Referring to FIG. 10, data latch unit 20 includes a data latch timing select circuit 21 and a data latch circuit 26. Data latch timing select circuit 21 receives edge detection signal EOUT provided from edge detecting circuit 10 in FIG. 5, and provides a latch enable signal REN corresponding to a timing select signal TM. Data latch circuit 26 provides data latch signal RDAT, which is prepared by latching externally applied digital data DD, according to latch enable signal REN.

Figure 11:
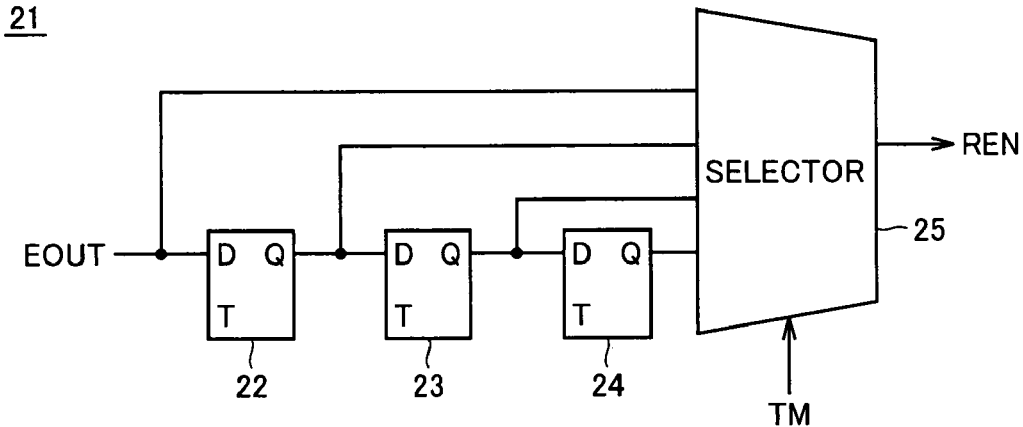
FIG. 11 is a circuit diagram showing a specific circuit structure of a data latch timing select circuit 21.

FIG. 11 is a circuit diagram showing a specific circuit structure of data latch timing select circuit 21.

Referring to FIG. 11, data latch timing select circuit 21 includes flip-flop circuits 22–24 and a selector 25. Flip-flop circuit 22 temporarily holds edge detection signal EOUT provided from edge detecting circuit 10 in FIG. 5. Flip-flop circuit 23 temporarily holds the output signal of flip-flop circuit 22. Flip-flop circuit 24 temporarily holds the output signal of flip-flop circuit 23.

Selector 25 selects one of edge detection signal EOUT and signals provided from flip-flop circuits 22–24, and provides it as latch enable signal REN. Timing select signal TM is controlled by software to set the optimum timing for data latching.

Figure 12:
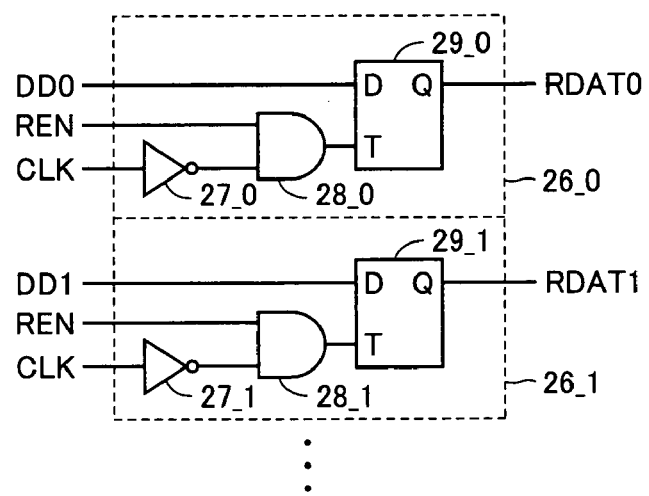
FIG. 12 is a circuit diagram showing a specific circuit structure of a data latch circuit 26.

FIG. 12 is a circuit diagram showing a specific circuit structure of data latch circuit 26.

Referring to FIG. 12, data latch circuit 26 includes data latch circuit units 26_k (k=0, 1, . . . ). Data latch circuit unit 26_k receives digital data DDk formed of a bit k in digital data DD. Data latch circuit units 26_0 and 26_1 will now be described.

Data latch circuit unit 26_0 includes an inverter 27_0, an AND circuit 28_0 and a flip-flop circuit 29_0. Inverter 27_0 inverts internal clock signal CLK. AND circuit 28_0 receives latch enable signal REN and the output signal of inverter 27_0. Flip-flop circuit 29_0 temporarily holds digital data DD0 of bit 0 according to timing of the signal provided from AND circuit 28_0, and then provides a data latch signal RDAT0 corresponding to digital data DD0.

Data latch circuit unit 26_1 includes an inverter 27_1, an AND circuit 28_1 and a flip-flop circuit 29_1. Inverter 27_1 inverts internal clock signal CLK. AND circuit 28_1 receives latch enable signal REN and the output signal of inverter 27_1. Flip-flop circuit 29_1 temporarily holds digital data DD1 of a bit 1 according to the timing of signal provided from AND circuit 28_1, and then provides a data latch signal RDAT1 corresponding to digital data DD1.

Figure 13:
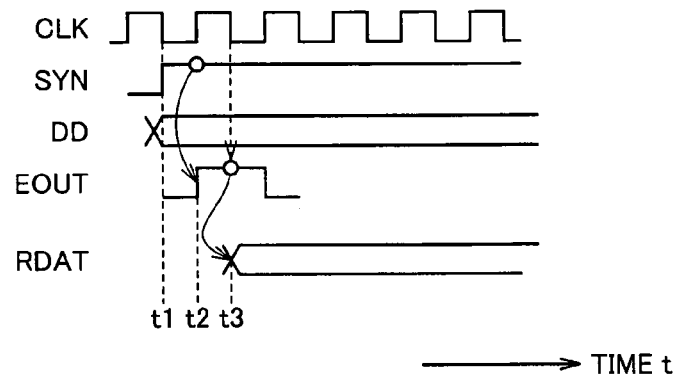
FIG. 13 is a timing diagram illustrating operation timing of data latch unit 20 according to an embodiment of the invention.

FIG. 13 is a timing diagram illustrating operation timing of data latch unit 20 according to the embodiment of the invention. FIG. 13 is a timing diagram illustrating an operation of detecting the rising edge of synchronous signal SYN.

As shown in FIG. 13, synchronous signal SYN rises in synchronization with internal clock signal CLK at time t1, and digital data DD changes in response to it. In response to the rising of synchronous signal SYN, edge detection signal EOUT rises to the H-level at time t2. At time t3, internal clock signal CLK falls to the L-level, and data latch signal RDAT is output in response to it.

Figure 14:
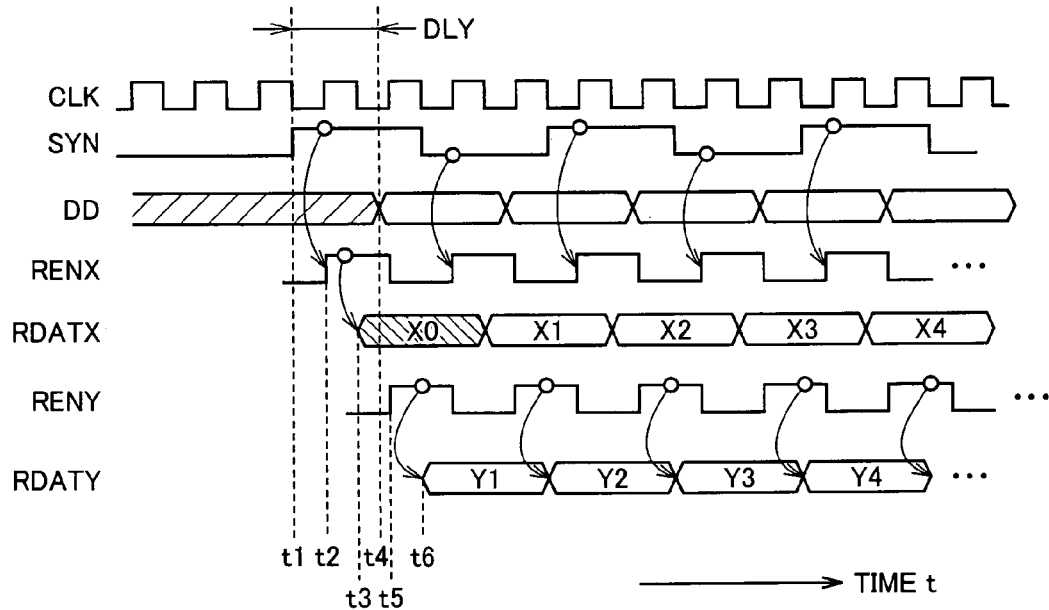
FIG. 14 is a timing diagram illustrating operation timing of data latch unit 20 in the case where digital data DD is delayed with respect to a synchronous signal SYN.

FIG. 14 is a timing diagram illustrating operation timing of data latch unit 20 in the case where digital data DD is delayed with respect to synchronous signal SYN.

As shown in FIG. 14, synchronous signal SYN rises at time t1, and digital data DD changes at time t4. Propagation delay DLY is present between synchronous signal SYN and digital data DD. Thereby, fixing of digital data DD is delayed as compared with the case shown in FIG. 13. Therefore, data latch circuit 26 may erroneously latch the previous digital data value.

It is now assumed that data latch timing select circuit 21 is not present in data latch unit 20. In this case, latch enable signal RENX rises at time t2 in response to the rising of synchronous signal SYN at time t1. In response to this, a data latch signal RDATX changes at time t3. However, digital data DD is still unchanged at time t3. Therefore, X0 among X0, X1, X2, . . . of data latch signal RDATX is erroneously latched to form an erroneous signal.

Description will now be given on the case where data latch timing select circuit 21 is present in data latch unit 20. In this case, latch enable signal RENY rises at time t5 delayed by a certain time from the rising of synchronous signal SYN at time t1. In response to this, a data latch signal RDATY changes at time t6. At time t6, digital data DD has already changed. Therefore, any one of Y0, Y1, Y2, . . . of data latch signal RDATY is not erroneously latched to form an erroneous signal.

Figure 15:
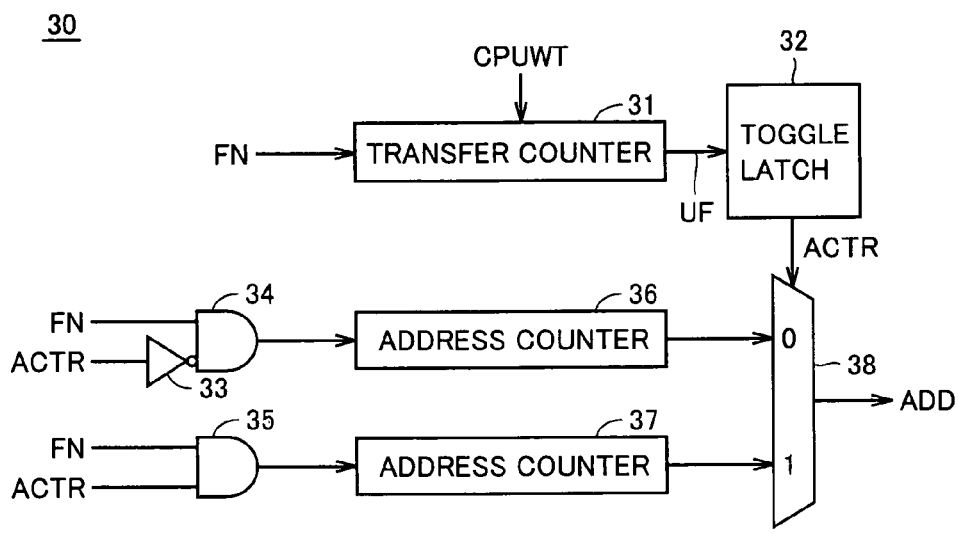
FIG. 15 is a block diagram showing a block structure of an address generating circuit 30 according to the embodiment of the invention.

FIG. 15 is a block diagram showing a block structure of address generating circuit 30 according to the embodiment of the invention.

Referring to FIG. 15, address generating circuit 30 includes a transfer counter 31, a toggle latch 32, an inverter 33, AND circuits 34 and 35, address counters 36 and 37, and a selector circuit 38.

Transfer counter 31 receives transfer completion signal FN and a transfer allowance bit CPUWT provided from CPU 80 in FIG. 5. Transfer counter 31 decrements a transfer count, which is preset by CPU 80, in response to every reception of transfer completion signal FN. Toggle latch 32 receives an underflow signal UF, and provides an address control signal ACTR.

Inverter 33 inverts address control signal ACTR. AND circuit 34 receives a signal provided from inverter 33 as well as transfer completion signal FN provided from arbitration circuit 60 in FIG. 5. Address counter 36 receives the output signal of AND circuit 34, and increments the address count. AND circuit 35 receives address control signal ACTR and transfer completion signal FN. AND circuit 35 receives address control signal ACTR and transfer completion signal FN. Address counter 37 receives the output signal of AND circuit 35, and increments the address count.

Selector circuit 38 selects one of the output signals of address counters 36 and 37 in accordance with address control signal ACTR provided from toggle latch 32, and provides it as address signal ADD to RAM 90 in FIG. 5. Thereby, address signal ADD can be switched every time the underflow occurs in transfer counter 31. Also, it is possible to distribute the data to be written into RAM 90 to two regions for storage.

Figure 23:
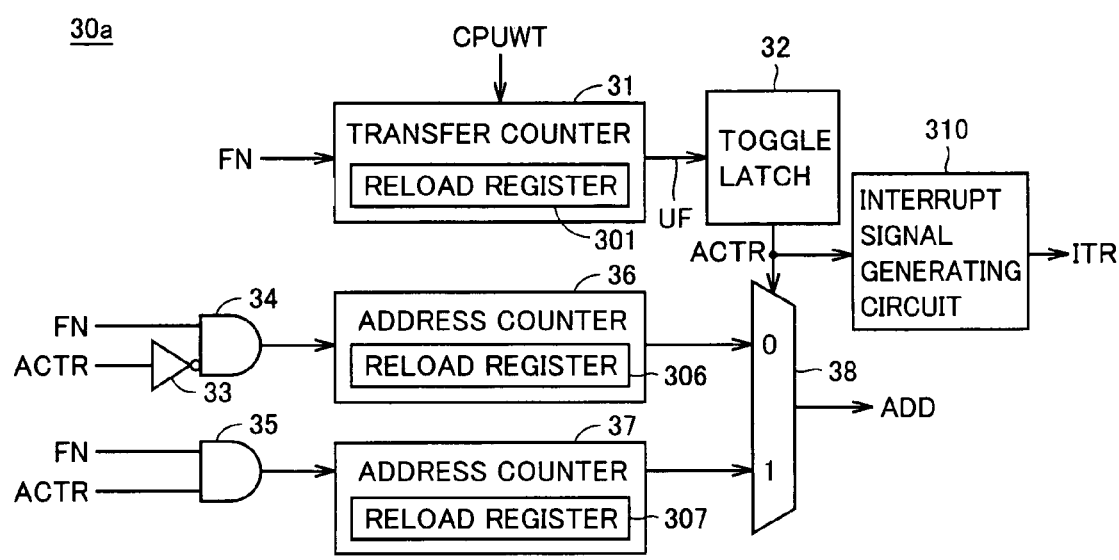
FIG. 23 is a block diagram showing a block structure of an address generating circuit 30a, which is a modification of an address generating circuit 30.

As shown in FIG. 23, transfer counter 31 may include a reload register 301 for returning the count to a constant value when certain conditions are satisfied. For example, the certain conditions are that transfer allowance bit CPUWT changes from the transfer prohibition to the transfer allowance, or that underflow occurs in the transfer count operation. Transfer allowance bit CPUWT is a latch output, which can be set by CPU 80. Likewise, address counters 36 and 37 may include reload registers 306 and 306 for returning the count to a constant value when the same conditions as the above are satisfied, respectively.

If transfer counter 31 and address counters 36 and 37 include foregoing reload registers 301, 306 and 307, all the hardware can operate to distribute the data to be written into RAM 90 to two regions for storage.

As shown in FIG. 23, address generating circuit 30 may include an interrupt signal generating circuit 310, which notifies CPU 80 in FIG. 5 that the underflow occurs in transfer counter 31 during the active state of address counters 36 and 37. For example, it is now assumed that address control signal ACTR provided from toggle latch 32 changes to switch the counter for selection by selector circuit 38 from address counter 36 to address counter 37. Also, address control signal ACTR provided from toggle latch 32 changes in response to the occurrence of the underflow in transfer counter 31.

In this case, interrupt signal generating circuit 310 generates an interrupt signal ITR corresponding to address counter 37. CPU 80 in FIG. 5 receives interrupt signal ITR, and can process the data to be stored in the region designated by address counter 36. During this, the externally applied data is stored in the region designated by address counter 37, and therefore does not impede the processing, which is performed by CPU 80 on the data in the region designated address counter 36. Accordingly, CPU 80 can process the data stored in the region designated by address counter 36, and at the same time, can continue the operation of taking in the externally applied data.

Figure 16:
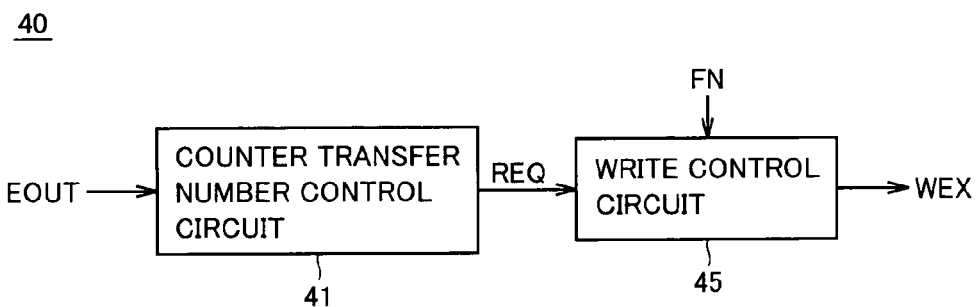
FIG. 16 is a block diagram showing a block structure of a write control unit 40 according to the embodiment of the invention.

FIG. 16 is a block diagram showing a block structure of write control unit 40 according to the embodiment of the invention.

Referring to FIG. 16, write control unit 40 includes a counter transfer number control circuit 41 and a write control circuit 45. Counter transfer number control circuit 41 receives edge detection signal EOUT provided from edge detecting circuit 10 in FIG. 5, and provides transfer request signal REQ. Write control circuit 45 receives transfer request signal REQ, and provides write control enable signal WEX.

Write control unit 40 receives edge detection signal EOUT, and activates write control enable signal WEX for writing data into RAM 90 in FIG. 5. Write control unit 40 receives transfer completion signal FN provided from arbitration circuit 60 in FIG. 5, and deactivates write control enable signal WEX.

Figure 17:
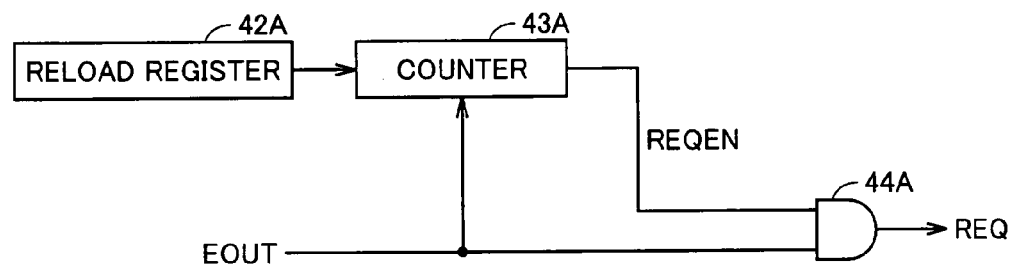
FIG. 17 is a block diagram showing a block structure of a counter transfer number control circuit 41A, which is an example of a counter transfer number control circuit 41.

FIG. 17 is a block diagram showing a block structure of a counter transfer number control circuit 41A, which is an example of counter transfer number control circuit 41.

Referring to FIG. 17, counter transfer number control circuit 41A includes a reload register 42A, a counter 43A and an AND circuit 44A.

Reload register 42A resets the count of counter 43A when CPU 80 in FIG. 5 allows the counting or when the underflow occurs. Counter 43A counts the edge of synchronous signal SYN by using edge detection signal EOUT provided from edge detecting circuit 10 in FIG. 5 as a count source, and provides a transfer request enable signal (underflow signal) REQEN. AND circuit 44A receives edge detection signal EOUT and transfer request enable signal REQEN, and provides transfer request signal REQ.

Counter transfer number control circuit 41A stops the counting after the first underflow occurred after the count allowance, or continues the counting by reloading the reload register value to counter 43A when the first edge is detected after the underflow occurred, and these two manners of operations can be selected by CPU 80.

When the mode of "stopping the counting after the underflow occurred" is selected, the reload register value is reloaded to counter 43A after the counting is allowed, and count-down of the count is performed in response to every detection of the edge of synchronous signal SYN. Until the underflow occurs in counter 43A, transfer request signal (underflow signal) REQEN keeps the L-level. Therefore, transfer request signal REQ provided from AND circuit 44A keeps the L-level even when the edge of synchronous signal SYN is detected.

When the underflow occurs in counter 43A, transfer request enable signal REQEN changes to the H-level. When the edge of synchronous signal SYN is detected thereafter, both the inputs of AND circuit 44A attain the H-level, and transfer request signal REQ is activated to attain the H-level. Thereby, control can be performed, e.g., in such a manner that the operation of taking in the external data starts after the edges of synchronous signal SYN is detected arbitrary times.

When the mode of "continuing the counting by reloading the reload register value to counter 43A" is selected, AND circuit 44A operates such that transfer request signal REQ attains the H-level only in response to the edge of synchronous signal SYN, which is detected during the underflow state of counter 43A. Thereby, control can be performed, e.g., in such a manner that the external data is taken in only one time in response to arbitrary times of detection of the edge of synchronous signal SYN.

Figure 18:
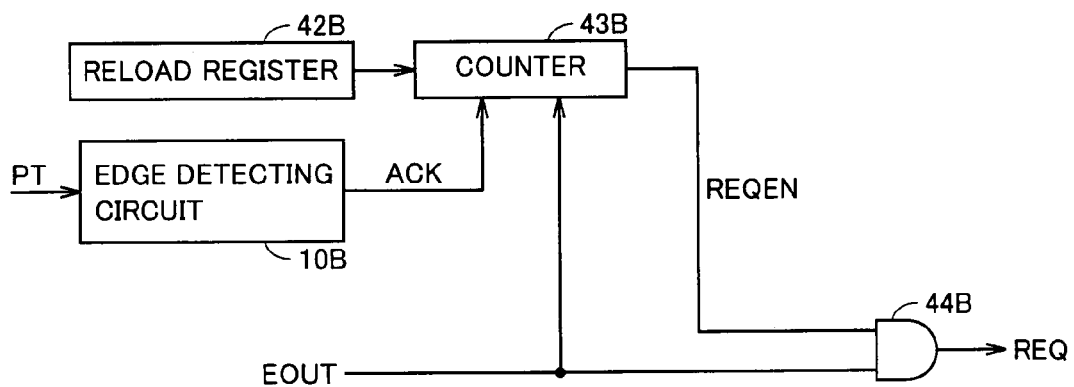
FIG. 18 is a block diagram showing a block structure of a counter transfer number control circuit 41B, which is another example of counter transfer number control circuit 41.

FIG. 18 is a block diagram showing a block structure of a counter transfer number control circuit 41B, which is another example of counter transfer number control circuit 41.

Referring to FIG. 18, counter transfer number control circuit 41B is prepared by developing counter transfer number control circuit 41A, and includes a reload register 42B, a counter 43B, an edge detecting circuit 10B and an AND circuit 44B.

Reload register 42B resets the count of counter 43B when CPU 80 in FIG. 5 allows counting or when underflow occurs. Edge detecting circuit 10B performs down-counting every time the edge of synchronous signal SYN is detected, and reloads the reload register value to counter 43B in response to externally applied allowance signal PT. Counter 43B counts the edge of synchronous signal SYN by using edge detection signal EOUT provided from edge detecting circuit 10 in FIG. 5 as a count source, and provides transfer request enable signal (underflow signal) REQEN. AND circuit 44B receives edge detection signal EOUT and transfer request enable signal REQEN, and provides transfer request signal REQ.

Counter transfer number control circuit 41B allows control of external count allowance, reloads the reload register value to counter 43B according to the external allowance, and performs down-counting in response to every detection of the edge of synchronous signal SYN. When the underflow occurs, transfer request signal REQ is activated to attain the H-level according to the detection of edge of synchronous signal SYN.

As an example, in which the control by counter transfer number control circuit 41B or the like is effective, control related to a CCD sensor will now be discussed. In the case of using the CCD sensor, an invalid image synchronous clock signal due to invalid pixels is generally issued until an actually valid image data is issued after vertical and horizontal synchronous signals VSYNC and HSYNC are asserted.

In the above case, horizontal synchronous signal HSYNC is used as an externally applied allowance signal PT shown, e.g., in FIG. 18, and an image synchronous signal is used as synchronous signal SYN so that the invalid pixel region is thinned out by hardware to select and take in only a required pixel region. Further, by dividing counter 43B into a plurality of counter circuits, more fine control can be performed for executing and stopping the take-in of the externally applied data.

Figure 19:
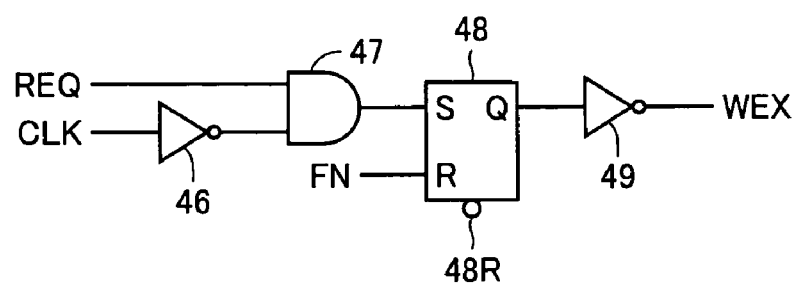
FIG. 19 is a circuit diagram showing a specific circuit structure of a write control circuit 45.

FIG. 19 is a circuit diagram showing a specific circuit structure of write control circuit 45.

Referring to FIG. 19, write control circuit 45 includes inverters 46 and 49, an AND circuit 47 and a flip-flop circuit 48. Inverter 46 inverts internal clock signal CLK. AND circuit 47 receives the output signal of inverter 46 and transfer request signal REQ provided from counter transfer number control circuit 41.

Flip-flop circuit 48 operates in synchronization with transfer completion signal FN provided from arbitration circuit 60 in FIG. 5, and temporarily holds the output signal of AND circuit 47. Inverter 49 inverts the output signal of flip-flop circuit 48 to provide write control enable signal WEX. Flip-flop circuit 48 has a reset terminal 48R for deactivating write control enable signal WEX when the hardware is to be reset.

Figure 20:
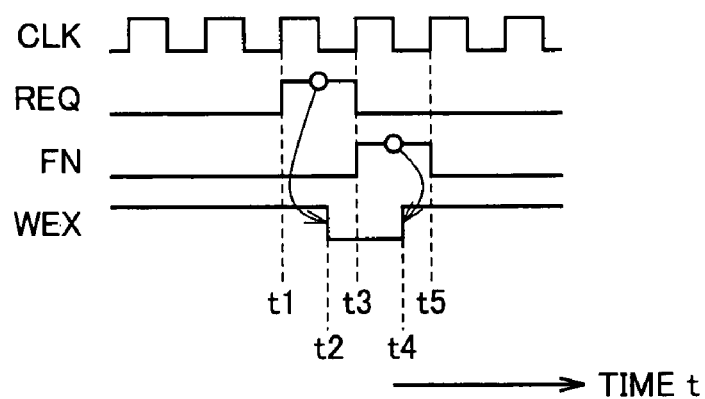
FIG. 20 is a timing diagram illustrating operation timing of write control circuit 45.

FIG. 20 is a timing diagram illustrating operation timing of write control circuit 45.

As illustrated in FIG. 20, transfer request signal REQ rises in synchronization with internal clock signal CLK at time t1. In response to it, write control enable signal WEX falls to the L-level at time t2. At time t3, transfer request signal REQ falls, and transfer completion signal FN rises. In response to it, write control enable signal WEX rises to the H-level at time t4. Transfer completion signal FN rises in synchronization with internal clock signal CLK at time t5.

Figure 21:
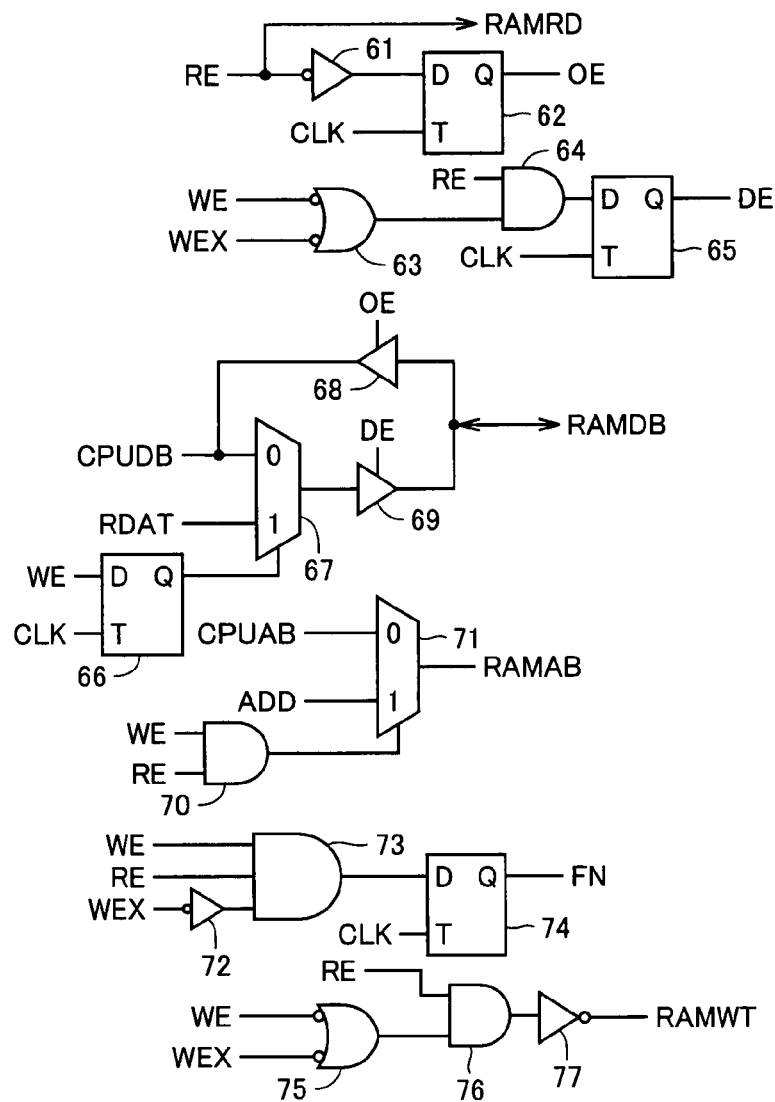
FIG. 21 is a circuit diagram showing a specific circuit structure of an arbitration circuit 60 according to the embodiment of the invention.

FIG. 21 is a circuit diagram showing a specific circuit structure of arbitration circuit 60 according to the embodiment of the invention.

Referring to FIG. 21, arbitration circuit 60 includes flip-flop circuits 62, 65, 66 and 74, a data bus selector 67, tristate buffers 68 and 69, AND circuits 64, 70, 73 and 76, an address selector 71, inverters 61, 72 and 77, and NAND circuits 63 and 75. Flip-flop circuits 62, 65, 66 and 74 operate in synchronization with internal clock signal CLK.

Inverter 61 inverts read enable signal RE provided from CPU 80 in FIG. 5. Read enable signal RE is also provided to RAM 90 as a read signal RAMRD for use within RAM 90. Flip-flop circuit 62 temporarily holds the output signal of inverter 61, and then provides it as an output enable signal OE.

NAND circuit 63 receives write enable signal WE provided from CPU 80 in FIG. 5 as well as write control enable signal WEX provided from write control unit 40 in FIG. 5.

AND circuit 64 receives read enable signal RE and the output signal of NAND circuit 63. Flip-flop circuit 65 temporarily holds the output signal of AND circuit 64, and then provides it as a data enable signal DE.

Flip-flop circuit 66 temporarily holds write enable signal WE. Data bus selector 67 selects either a CPU data bus signal CPUDB provided from CPU 80 or data latch signal RDAT provided from data latch unit 20 in FIG. 5 according to write enable signal WE. Data bus selector 67 selects CPU data bus signal CPUDB when write enable signal WE is at the L-level, and selects data latch signal RDAT when write enable signal WE is at the H-level.

When CPU 80 performs write-access to RAM 90, write enable signal WE attains the L-level. Subsequently to this, data bus selector 67 provides a CPU data bus signal CPUDB in synchronization with the rising of internal clock signal CLK. This operation, in which data bus selector 67 provides CPU data bus signal CPUDB in synchronization with the rising of internal clock signal CLK, is performed for the purpose of matching with the timing of data output of CPU 80.

Tristate buffer 68 buffers a RAM data bus signal RAMDB, which is provided from RAM 90, according to output enable signal OE. When CPU 80 performs read-access to RAM 90, tristate buffer 69 provides RAM data bus signal RAMDB onto the data bus of CPU 80 according to output enable signal OE.

Output enable signal OE is prepared by latching the inverted signal of read enable signal RE with internal clock CLK. This manner of latching the inverted signal of read enable signal RE with internal clock CLK is employed for the purpose of matching with the timing of first rising of internal clock CLK, which occurs after read enable signal RE attained the L-level.

Tristate buffer 69 buffers the output signal of data bus selector 62 according to data enable signal DE. Tristate buffer 69 provides the output signal of data bus selector 62 onto the data bus inside RAM 90 according to data enable signal DE when CPU 80 executes the write-access to RAM 90, or when transfer request signal REQ becomes active.

Data enable signal DE is prepared by latching the logical output of write enable signal WE, write control enable signal WEX and read enable signal RE with internal clock signal CLK. The latching of the logical output of these control signals with internal clock signal CLK is performed for the purpose of matching with the timing of output of the write data from CPU 80. In other words, it is performed for the purpose of matching with a bus access protocol of RAM 90. Read enable signal RE is required for determining the state, in which CPU 90 is performing the read-access.

AND circuit 70 receives read and write enable signals RE and WE. Address selector 71 selects either a CPU address bus signal CPUAB provided from CPU 80 or address signal ADD provided from address generating circuit 30 in FIG. 5 according to the output signal of AND circuit 70, and provides the selected signal to RAM 90 as read signal RAMRD. Address selector 71 selects CPU address bus signal CPUAB when read or write enable signal RE or WE is at the L-level, and selects address signal ADD when read and write signals RE and WE are both at the H-level.

Inverter 72 inverts write control enable signal WEX. AND circuit 73 receives read enable signal RE, write enable signal WE and the output signal of inverter 72. Flip-flop circuit 74 temporarily holds the output signal of AND circuit 73, and then provides it as transfer completion signal FN to address generating circuit 30 and write control unit 40 in FIG. 5.

Transfer completion signal FN is a signal notifying that the data transfer request to write control unit 40 is completed. Transfer completion signal FN becomes active when read and write enable signals RE and WE are both at the H-level, and write control enable signal WEX is at the L-level. In this case, CPU 80 is not accessing RAM 90, and there is a request for transferring taken digital data DD. In this state, the transfer request for digital data DD is performed so that transfer completion signal FN attains the H-level.

Transfer completion signal FN, which attains the H-level, is provided to write control unit 40. Thereby, write control enable signal WEX is deactivated, and the transfer of externally applied digital data DD is completed. As already described with reference to FIG. 15, address generating circuit 30 in FIG. 5 is formed of address counters 36 and 37, and the count source thereof is formed of transfer completion signal FN. Thereby, different destination addresses can be set for the respective write data in RAM 90, respectively.

NAND circuit 75 receives write enable signal WE and write control enable signal WEX. AND circuit 76 receives read enable signal RE and the output signal of NAND circuit 75. Inverter 77 inverts the output signal of AND circuit 76, and provides it as write signal RAMWT for RAM 90.

Figure 22:
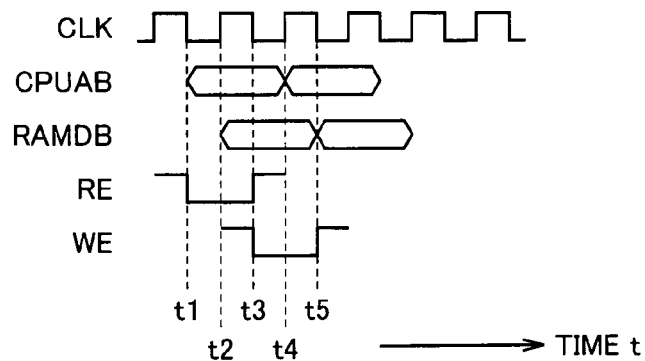
FIG. 22 is a timing diagram illustrating operation timing of arbitration circuit 60 according to the embodiment of the invention.

FIG. 22 is a timing diagram illustrating operation timing of arbitration circuit 60 according to the embodiment of the invention.

At time t1, as illustrated in FIG. 22, read enable signal RE falls in synchronization with internal clock signal CLK, and CPU address bus signal CPUAB is applied. At time t2, RAM data bus signal RAMDB is issued in synchronization with internal clock signal CLK. At time t3, read enable signal RE rises in synchronization with internal clock signal CLK, and also write enable signal WE falls.

At time t4, CPU address bus signal CPUAB is input in synchronization with internal clock signal CLK. At time t5, write enable signal WE rises in synchronization with internal clock signal CLK, and RAM data bus RAMDB is issued. As described above, both CPU address bus signal CPUAB provided to RAM 90 in FIG. 5 and RAM data bus signal RAMDB provided from RAM 90 change according to read enable signal RE and/or write enable signal WE.

For accessing RAM 90 for reading or writing, address signal ADD, the data signal such as data latch signal RDAT, read enable signal RE and write enable signal AE are required. Address signal ADD is an input for RAM 90. Read enable signal RE is an input for RAM 90, and attains the L-level only during the read-access operation. Write enable signal WE is an input for RAM 90, and attains the H-level only during the write-access operation. The cycle of access to RAM 90 is equal to one cycle of internal clock CLK of microcomputer 1.

As described above, the bus cycle, in which CPU 80 does not access RAM 90, is detected, and the operation of writing into RAM 90 is performed during the bus cycle thus detected. Thereby, it is possible to store digital data DD, which is externally taken in, in RAM 90 without impeding the operation of CPU 80. Although the embodiment of the invention employs RAM 90 as an example of the storage device, the storage device may be formed of any writable storage device.

According to the embodiment of the invention, as described above, write control enable signal WEX, read enable signal RE and write enable signal WE are monitored to detect the cycle, in which CPU 80 does not access RAM 90. Thereby, an influence by bus contention between the CPU and the DMA is minimized, and the setup-time/hold-time can be flexibly changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microcomputer comprising:
an edge detecting circuit detecting a change in input level of an externally applied synchronous signal, and providing an edge detection signal notifying of the change in input level;
a data latch unit receiving said edge detection signal, and providing a data latch signal by latching externally applied external data;
an address generating circuit generating an address signal;
a local bus receiving said data latch signal and said address signal;
a write control unit receiving said edge detection signal, and activating a write control enable signal;
a central processing unit providing a read enable signal and a write enable signal;
a data bus receiving data for input/output to or from said central processing unit;
a storage device storing said external data;
a memory bus receiving data for input/output to or from said storage device; and
an arbitration circuit connected to said local bus, said data bus and said memory bus, monitoring said write control enable signal, said read enable signal and said write enable signal, and detecting a cycle executed without accessing to said memory by said central processing unit.

2. The microcomputer according to claim 1, wherein said edge detecting circuit detects a rising or falling edge of said synchronous signal, and software is used to determine which one to be detected between said rising edge and said falling edge.

3. The microcomputer according to claim 1, wherein said data latch unit includes:
a data latch timing select circuit receiving said edge detection signal, and providing a latch enable signal corresponding to a timing select signal controlled by software, and
a data latch circuit providing said data latch signal prepared by latching said external data according to said latch enable signal; and
said data latch circuit has a plurality of data latch circuit units corresponding in number to bits of said external data, respectively.

4. The microcomputer according to claim 1, wherein said address generating circuit includes:
a transfer counter receiving a transfer completion signal provided from said arbitration circuit and a transfer allowance bit provided from said central processing unit, and providing an underflow signal for detecting occurrence of underflow in a transfer counting operation,
a toggle latch receiving said underflow signal, and providing an address control signal, first and second address counters incrementing address counts according to said transfer completion signal and said address control signal, and a selector circuit selecting one of output signals of said first and second address counters according to said address control signal, and providing the selected signal as said address signal.

5. The microcomputer according to claim 4, wherein said transfer counter has a first reload register returning a count to a predetermined value when said transfer allowance bit changes from transfer-prohibition to transfer-allowance, or when underflow occurs in the transfer count operation.

6. The microcomputer according to claim 4, wherein said address generating circuit further includes an interrupt signal generating circuit generating an interrupt signal notifying said central processing unit of the occurrence of the underflow when the underflow occurs in the transfer count operation during the active state of said first and second address counters.

7. The microcomputer according to claim 1, wherein said write control unit includes:

a counter transfer number control circuit receiving said edge detection signal and providing a transfer request signal, and a write control circuit receiving said transfer request signal and a transfer completion signal provided from said arbitration circuit, and providing said write control enable signal.

8. The microcomputer according to claim 7, wherein said counter transfer number control circuit operates, according to selection by said central processing unit, to stop the count operation after the first occurrence of the underflow after count allowance, or to continue the count operation by reloading a reload register value in response to first detection of an edge of said synchronous signal after the occurrence of the underflow.

9. The microcomputer according to claim 7, wherein count allowance is externally controlled, and said counter transfer number control circuit reloads a load register value according to said external allowance, performs count-down in response to every detection of said synchronous signal, and activates said transfer request signal according to detection of an edge of said synchronous signal after occurrence of underflow.

10. The microcomputer according to claim 1, wherein said arbitration circuit includes:

a data bus selector selecting one of said data latch signal and a CPU data bus signal provided from said central processing unit according to said write enable signal;

a first tristate buffer providing a RAM data bus signal provided from said storage device onto a data bus of said central processing unit according to an output enable signal prepared by latching an inverted signal of said read enable signal with an internal clock signal;

a second tristate buffer providing an output signal of said data bus selector onto an internal data bus of said storage device according to a data enable signal prepared by latching a logical output of the write enable signal, the write control enable signal and the read enable signal with said internal clock signal;

an address selector selecting one of said address signal and a CPU address bus signal provided from said central processing device according to a logical output of said read enable signal and said write enable signal; and a logic circuit group receiving said write enable signal, said read enable signal and said write control enable signal, and producing the transfer completion signal notifying said write control unit of completion of a data transfer request.

* * * * *